United States Patent
Jackson (10) Patent No.: US 9,634,541 B2
(45) Date of Patent: Apr. 25, 2017

(54) APPARATUS TO PROVIDE MOTOR BACKDRIVE RESISTANCE

(71) Applicant: Fisher Controls International LLC, Marshalltown, IA (US)

(72) Inventor: Trenton Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 173 days.

(21) Appl. No.: 13/933,946

(22) Filed: Jul. 2, 2013

(65) Prior Publication Data

US 2015/0008349 A1    Jan. 8, 2015

(51) Int. Cl.
| | | |
|---|---|---|
| *F16K 31/04* | (2006.01) |
| *F16D 49/04* | (2006.01) |
| *F16D 49/16* | (2006.01) |
| *F16D 65/18* | (2006.01) |
| *H02K 7/02* | (2006.01) |
| *H02K 7/102* | (2006.01) |
| *F16D 121/14* | (2012.01) |
| *F16D 125/28* | (2012.01) |
| *F16D 125/66* | (2012.01) |
| *F16D 125/68* | (2012.01) |

(52) U.S. Cl.
CPC ............ *H02K 7/102* (2013.01); *F16D 49/04* (2013.01); *F16D 49/16* (2013.01); *F16D 65/18* (2013.01); *F16K 31/043* (2013.01); *F16D 2121/14* (2013.01); *F16D 2125/28* (2013.01); *F16D 2125/66* (2013.01); *F16D 2125/68* (2013.01); *F16K 31/047* (2013.01)

(58) Field of Classification Search
CPC ..... F16K 31/043; F16K 31/047; H02K 7/102; F16D 49/04; F16D 49/16; F16D 65/18; F16D 2121/14; F16D 2125/28; F16D 212/66; F16D 2125/68; F16D 41/20
USPC .......... 192/223; 251/129.11, 129.12, 129.13; 248/666
See application file for complete search history.

(56) References Cited

U.S. PATENT DOCUMENTS

| | | | |
|---|---|---|---|
| 3,986,586 A * | 10/1976 | Mauger et al. ........... 188/264 R |
| 7,861,840 B1 | 1/2011 | Dornan |
| 2009/0277726 A1 * | 11/2009 | Wasser ......................... 188/71.2 |

FOREIGN PATENT DOCUMENTS

| | | |
|---|---|---|
| CH | 207123 | 9/1939 |
| FR | 937012 | 8/1948 |
| WO | 2013079891 | 6/2013 |

OTHER PUBLICATIONS

Translation of FR 937012.*

(Continued)

*Primary Examiner* — Kevin Murphy
*Assistant Examiner* — Kelsey Rohman
(74) *Attorney, Agent, or Firm* — Hanley, Flight & Zimmerman, LLC (57) ABSTRACT

Apparatus to provide motor backdrive resistance are described. An example apparatus described herein includes a brake to engage an output shaft of a motor. The example apparatus also includes a brake release arm operably coupled to the brake. A reaction arm is fixed relative to the brake release arm and operatively coupled to the motor. The reaction arm causes the brake to disengage the output shaft of the motor in response to a reaction torque of the motor.

20 Claims, 6 Drawing Sheets

(56) References Cited

OTHER PUBLICATIONS

Translation of CH 207123.*
Auma Riester GmbH & Co, KG, "Anti-Backdrive Device," Retrieved from [http://www.don-arsenal.ru/netcat_files/pdf/in_lms1_en.pdf] on Mar. 27, 2014, 4 pages.
Patent Cooperation Treaty, "International Search Report," issued in connection with corresponding PCT Application No. PCT/US2014/045179, mailed on May 26, 2015, 4 pages.
Patent Cooperation Treaty, "Written Opinion," issued in connection with corresponding PCT Application No. PCT/US2014/045179, mailed on May 26, 2015, 7 pages.
International Bureau, "International Preliminary Report on Patentability," issued in connection with PCT application Serial No. PCT/US2014/045179, issued Jan. 5, 2016 (9 pages).

\* cited by examiner

APPARATUS TO PROVIDE MOTOR BACKDRIVE RESISTANCE

FIELD OF THE DISCLOSURE

This disclosure relates generally to motors, and, more particularly, to apparatus to provide motor backdrive resistance.

BACKGROUND

Process plants typically include numerous control loops networked together to produce a product. A rotary valve is often an important element in a control loop. The rotary valve may manipulate a flowing fluid, such as gas, steam, water, or chemical compounds to keep process variables as close as possible to a desired set point. The rotary valve, sometimes referred to as a valve or rotary valve assembly, typically includes a valve body, internal trim parts, an actuator (e.g., an electric actuator, a hydraulic actuator, etc.) to provide the motive power to operate (e.g., open or close) the valve, and a variety of additional valve accessories, such as positioners, transducers, supply pressure regulators, manual operators, etc.

Electric actuators often employ a motor operatively coupled to a flow control or closure member (e.g., a valve disk) of a valve (e.g., a rotary valve, a control valve, a throttling valve, etc.) via a drive system (e.g., one or more gears). During operation, when electric power is supplied to the motor, the electric actuator rotates the flow control member between a closed position and an open position to regulate fluid flowing through the valve. When the valve is closed, the fluid flow control member is typically configured to sealingly engage a valve seat disposed within the fluid flow path to prevent the flow of fluid between an inlet and an outlet of the valve.

When the valve is in the closed position and electric power is provided to the motor, the motor typically provides sufficient seat load to the fluid flow control member to ensure that the fluid flow control member is in sealing engagement with the seat of the valve. When electric power is removed from the motor, the drive system may be designed to maintain the position of the fluid flow control member relative to the valve seat. However, forces from fluid flow through the valve can be conveyed to the motor when the actuator is in position. These forces may be sufficient to backdrive the motor and, thus, may result in an unwanted position change of the fluid flow control member with unknown effects on the control loop.

SUMMARY

Apparatus to provide motor backdrive resistance are disclosed herein. An example apparatus includes a brake to engage an output shaft of a motor. The example apparatus also includes a brake release arm operatively engaged to the brake. A reaction arm is fixed relative to the brake release arm and operatively coupled to the motor to cause the brake to disengage the output shaft of the motor in response to a reaction torque of the motor.

In another example, an apparatus includes a first brake pad and a second brake pad. The apparatus also includes a spring operatively coupled to the first brake pad and the second brake pad. The spring holds the first brake pad and the second brake pad in an engaged position to prevent rotation of an output shaft of a motor when power to the motor is removed. The apparatus also includes a brake release arm operatively coupled to the first brake pad and the second brake pad. The apparatus also includes a reaction arm fixed to the brake release arm and to be operatively coupled to the motor. The reaction arm causes the brake release arm to bias the first brake pad and the second brake pad to disengage the output shaft to enable rotation of the output shaft.

In yet another example, an apparatus includes means for braking an output shaft of a motor to prevent rotation of the output shaft. The apparatus also includes means for disengaging the means for braking from the output shaft to enable rotation of the output shaft in response to a reaction torque of the motor.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

In general, the examples described herein provide motor backdrive resistance to a drive motor (e.g., via a brake coupled to an output shaft of the motor) of an electric actuator when electric power to the motor is removed. For example, electric power to the drive motor may be removed when a rotary valve fluid flow control member (e.g. a valve disk, a ball, an eccentric plug, etc.) is in a set position (e.g., a control loop associated with the rotary valve has reached a desired set point). In some such examples, the valve position may remain substantially fixed. However, when using electric actuators, the force from the fluid flow in the rotary valve may be exerted on an output shaft of the motor when the actuator is in a set position. As a result, an unwanted change in position of the output shaft and, thus, any flow control member coupled thereto may occur with unexpected or unknown effects on the control loop. In addition, to correct the shaft position in response to repeated changes in the shaft position, the drive motor is re-energized by the control loop, resulting in a motor that operates substantially continuously.

The examples disclosed herein include a braking assembly, which may be disposed within a housing or casing of an electric actuator and which is operatively coupled to the drive motor to provide mechanical resistance to back driving forces caused by fluid flow within the rotary valve. As a result, the position of the flow control member is held in position mechanically, thereby eliminating repeated electrical repositioning of the valve fluid flow control member.

With the example braking assembly described herein, when the drive motor is operated (e.g., energized), a reaction torque (or reaction force or output force) of the motor causes a brake release arm of the braking assembly to disengage brake pads from an output shaft of the motor to enable the output shaft to rotate. More specifically, the reaction torque causes a reaction arm of the braking assembly fixed (e.g., bolted) to the motor to rotate. The rotation of the reaction arm moves the brake release arm, which is rigidly coupled to the reaction arm. The movement of the brake release arm moves the brake pads apart, resulting in an opening between the brake pads and the output shaft, thereby enabling the output shaft to rotate freely.

When the drive motor is stopped (e.g., the motor is de-energized by removing electric power from the motor), a spring load pulls the brake pads together, which causes the brake pads to engage the output shaft and prevent rotation of the output shaft. More specifically, the brake pads are held in place via a spring coupled to spring-retaining bosses of the brake pads. The load generated by the spring pulls the brake pads together to clamp the output shaft. However, as described above, the reaction torque of the drive motor while operating overcomes the spring load, and the force of the brake release arm engaging the brake pads pushes the brake pads apart.

Figure 1:
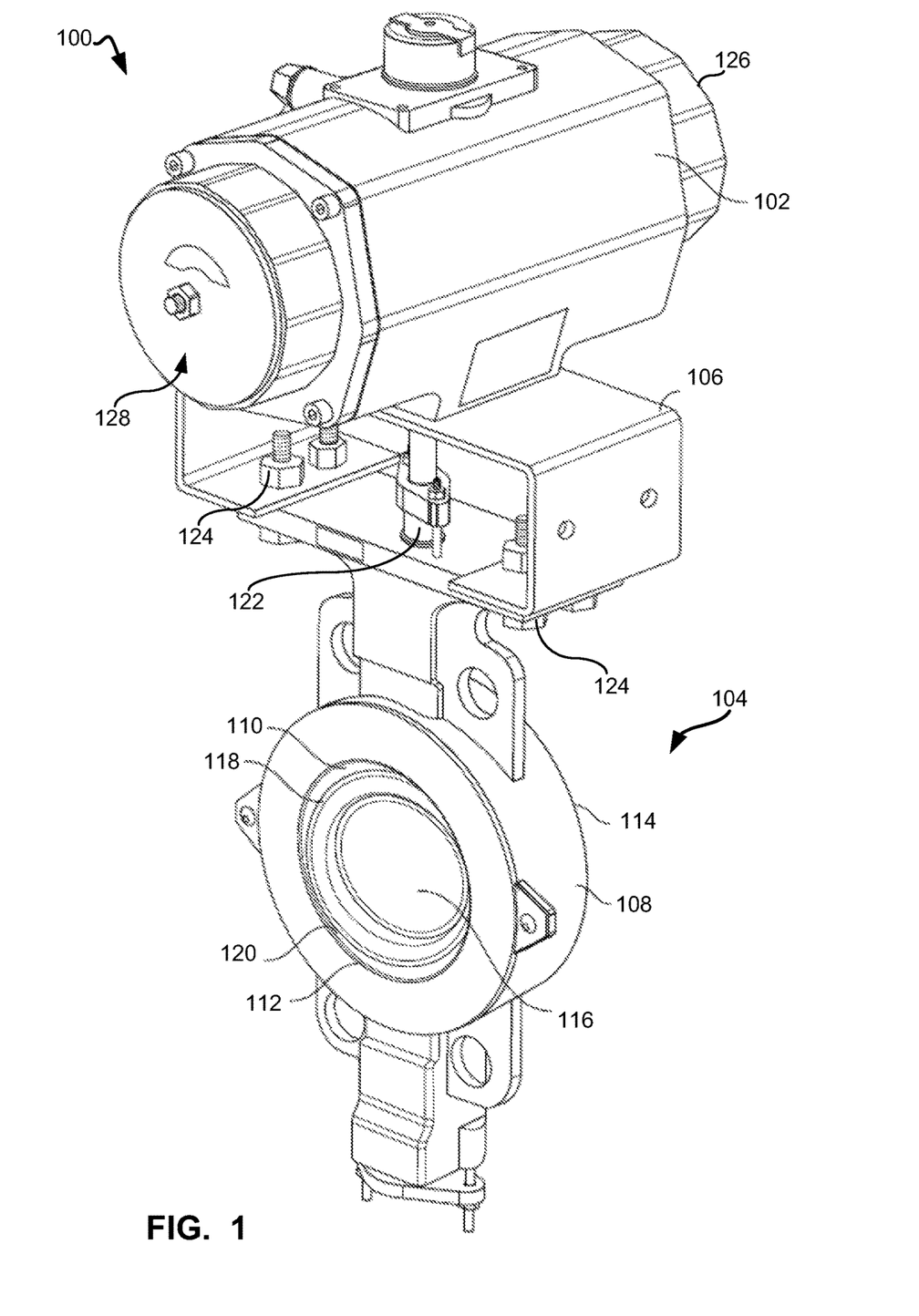
FIG. 1 is a perspective view of an example rotary valve assembly described herein.

FIG. 1 illustrates an example rotary valve assembly 100 described herein. The rotary valve assembly 100 includes an electric actuator 102 operatively coupled to a rotary valve 104 via a mounting bracket 106. The rotary valve 104 (e.g., a butterfly valve, an eccentric plug valve, a full bore ball valve, a segmented ball valve, etc.) includes a valve body 108 that defines a fluid flow passageway 110 between an inlet 112 and an outlet 114. A fluid flow control member 116 (e.g., a valve disk) is disposed within the fluid flow passageway 110 and includes a seating surface 118 that sealingly engages a valve seat or annular sealing surface 120 (e.g., a seal ring) to control fluid flow through the fluid flow passageway 110 between the inlet 112 and the outlet 114. A valve stem 122 is coupled (e.g., threadably coupled) to the fluid flow control or closure member 116 at a first end and is operatively coupled to the electric actuator 102 at a second end. The mounting bracket 106 and a plurality of fasteners 124 couple the valve body 108 to the electric actuator 102.

The electric actuator 102 includes a housing 126 that defines a cavity 128 to receive a drive system.

In the illustrated example, the fluid flow control member 116 is depicted as a disk. However, in other examples, the fluid flow control member 116 may be any suitable fluid flow control member 116 such as, for example, a segmented ball, etc.

Figure 2:
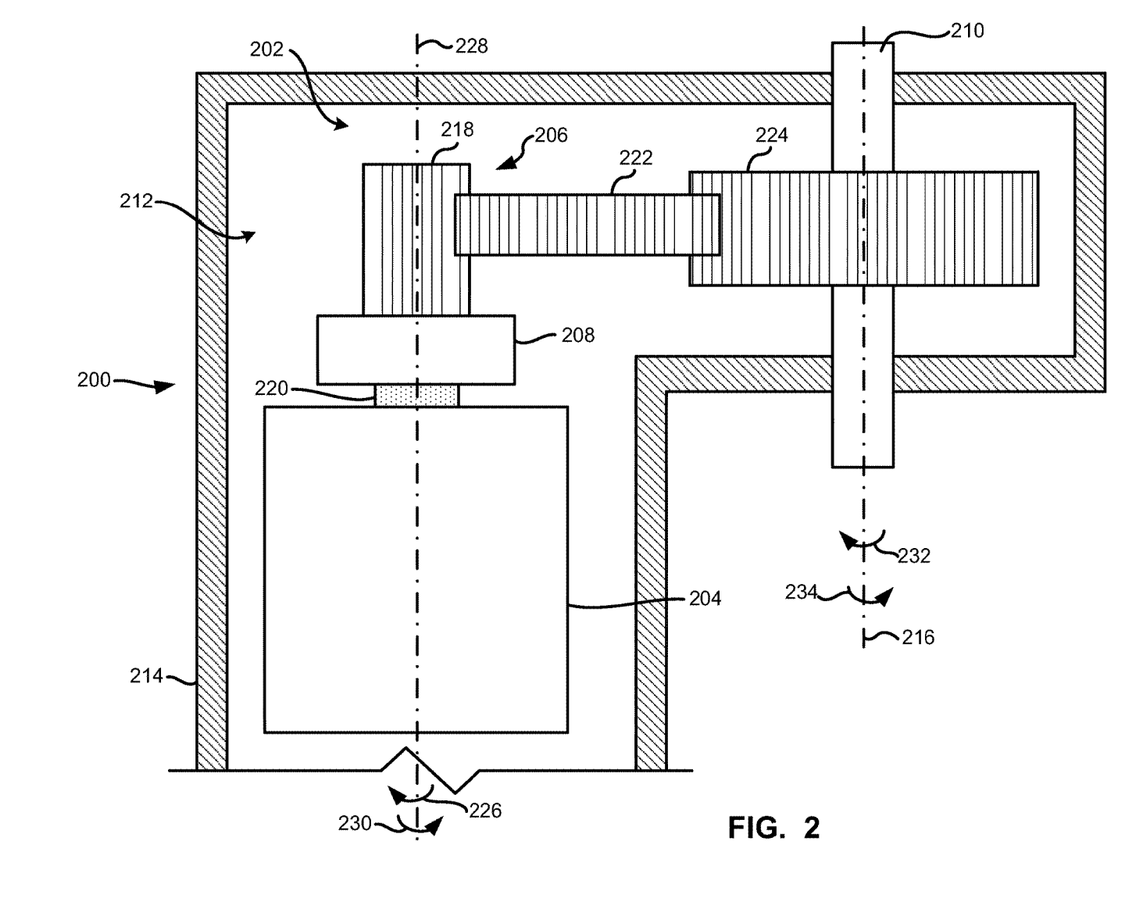
FIG. 2 is an enlarged portion of an example actuator including an example motor and an example braking assembly.

FIG. 2 illustrates an enlarged portion of an electric actuator 200 that may be used with the example rotary valve assembly 100 of FIG. 1. In this example, a drive system 202 includes a motor 204, a transmission 206, and a braking assembly 208. The transmission 206 transfers rotational motion of the motor 204 to rotational motion of a drive shaft 210.

The transmission 206 may be configured to increase the torque generated by the motor 204 and transmit the increased torque to the drive shaft 210. The increased torque transmitted to the drive shaft 210 enables the fluid flow control member 116 (FIG. 1) to engage the valve seat 120 (FIG. 1) with a greater force and, thus, provide a tighter sealing engagement with the valve seat 120 to prevent the flow of fluid through the valve body 108 (FIG. 1) when the fluid flow control member 116 is sealingly engaged with the valve seat 120 and electric power is provided to the motor 204.

As shown, the transmission 206 is disposed within a cavity 212 of a housing 214 of the electric actuator 200. The motor 204 is also disposed within the cavity 212 of the electric actuator 200. In some examples, the motor 204 may be coupled to a gearbox (e.g., to a housing of the gearbox) of the transmission 206 via, for example, a fastener and/or any other suitable fastening mechanism(s). However, in other examples, the motor 204 may be coupled to the housing 214 of the electric actuator 200 via fasteners or any other suitable fastening mechanism(s). In some examples, the motor 204 may be coupled to an interior surface of the housing 214 or to an exterior surface of the housing 214. The motor 204 may be any motor such as, for example, an alternating current (AC) motor, a direct current (DC) motor, a variable frequency motor, a stepper motor, a servo motor, or any other suitable motor or drive member.

In the illustrated example, the transmission 206 includes a first gear 218 rigidly coupled to an output shaft 220 of the motor 204 and engages an intermediate gear 222. The intermediate gear 222 couples the first gear 218 and, thus, the motor 204 to a drive gear 224. The drive gear 224 includes an aperture (not shown) to receive the drive shaft 210, which can rotate freely about the axis 216.

As shown, the drive shaft 210 is a rod. The opening of the drive shaft 210 receives the second end of the valve stem 122. Although not shown, in other examples, the drive shaft 210 may be a gear system, a ball screw system, and/or any other suitable transmission system to transfer rotational motion of the motor 204 to rotational motion of the valve stem 122.

Referring to FIGS. 1 and 2, in operation, the motor 204 drives or rotates the output shaft 220 in a first direction 226 (e.g., a clockwise direction) about an axis 228 to move (e.g., rotate) the rotary valve 104 toward an open position and a second direction 230 (e.g., a counterclockwise direction) opposite the first direction 226 about the axis 228 to move (e.g., rotate) the rotary valve 104 toward a closed position.

To move (e.g., rotate) the rotary valve 104 toward the open position, electric power is provided to the motor 204 to rotate the output shaft 220 in the first direction 226. The transmission 206 causes the drive gear 224 to rotate about the drive shaft 210 to cause the drive shaft 210 to move (e.g., rotate) in a rotational motion along the axis 216. More specifically, as the output shaft 220 and the first gear 218 rotate in the first direction 226, the intermediate gear 222 rotates the drive gear 224 in a first direction 232 about the axis 216. As a result, the drive gear 224 rotates about the drive shaft 210 and causes the drive shaft 210 to rotate in the first direction 232 along the axis 216. The drive shaft 210 causes the valve stem 122 and, thus, the fluid flow control member 116 to rotate away from the valve seat 120 to allow or increase fluid flow through the fluid flow passageway 110 between the inlet 112 and the outlet 114.

To move (e.g., rotate) the rotary valve 104 toward the closed position, electric power is provided to the motor 204 to cause the output shaft 220 to rotate in the second direction 230 (e.g., a counterclockwise direction) about the axis 228. Rotation of the output shaft 220 in the second direction 230 causes the drive shaft 210 to move (e.g., rotate) in a second direction 234 along the axis 216. More specifically, as the output shaft 220 and the first gear 218 rotate in the second direction 230 about the axis 228, the intermediate gear 222 rotates the drive gear 224 in the second direction 234 about the axis 216, causing the drive shaft 210 to move (e.g., rotate) in the second direction 234 about the axis 216. Rotation of the drive gear 224 in the second direction 234 about the axis 216 causes the drive shaft 210 and, thus, the fluid flow control member 116 to rotate toward the valve seat 120 to prevent or restrict fluid flow through the fluid flow passageway 110 between the inlet 112 and the outlet 114.

When the rotary valve 104 is in the closed position, the seating surface 118 of the fluid flow control member 116 sealingly engages the valve seat 120 to prevent fluid flow through the rotary valve 104. When the fluid flow control member 116 is in engagement with the valve seat 120, the drive shaft 210 is prevented from rotating further toward the valve seat 120 because the drive shaft 210 is rigidly coupled to the valve stem 122. In other words, the drive shaft 210 is at an end-of-stroke position when the fluid flow control member 116 is sealingly engaged with the valve seat 120. However, in other examples, the end-of-stroke position or end of travel may occur when a surface of the drive shaft 210 engages a portion or surface of the housing 214, or any other surface.

When electric power is removed from the motor 204, the motor 204 and/or the transmission 206 may lack sufficient resistance to maintain the position or prevent rotational motion of the drive shaft 210 and, thus, the fluid flow control member 116. A sufficient backdrive resistance provides resistance to substantially prevent motion (e.g., force) caused by fluid flow effects within the rotary valve 104 when electric power to the motor 204 is removed. Absent such a backdrive resistance, the force from the fluid flow may be exerted on the motor 204 and result in an unwanted position change of the fluid flow control member 116.

As described below in greater detail in connection with FIGS. 3A-3D, when the braking assembly 208 is operatively coupled to the motor 204, the braking assembly 208 provides a mechanical brake to maintain the position of the fluid flow control member 116 if electric power is removed from the motor 204. For example, it may be desirable to maintain the rotary valve 104 in the closed position to prevent a spill (e.g., a chemical spill) during emergency situations, power failures, or if the electric power supply to the electric actuator 102 (e.g., the motor 204) is removed or shut down. Otherwise, failing to provide an adequate or sufficient backdrive resistance to the fluid flow forces during, for example, a power outage may cause fluid flow to pass through the fluid flow passageway 110 of the rotary valve 104 between the inlet 112 and the outlet 114. For example, the pressure of the pressurized fluid at the inlet 112 may provide a force against the fluid flow control member 116 (e.g., in a direction toward the outlet 114 in the orientation of FIG. 1) to cause the seating surface 118 of the fluid flow control member 116 to rotate away from the valve seat 120 and allow fluid to flow or leak toward the outlet 114 when electric power to the motor 204 is removed.

Thus, the example braking assembly 208 provides backdrive resistance to the motor 204 to prevent unwanted fluid flow through the fluid flow passageway 110 when the rotary valve 104 is in a closed position and electric power is removed from the electric actuator 102. Further, the braking assembly 208 provides motor backdrive resistance without consumption of electric power (i.e., with substantially zero electric power consumption). Thus, in some examples, when the rotary valve 104 is in a set position, electric power to the motor 204 may be removed to conserve energy, thereby improving the performance and/or the efficiency of the electric actuator 102.

Figure 3A:
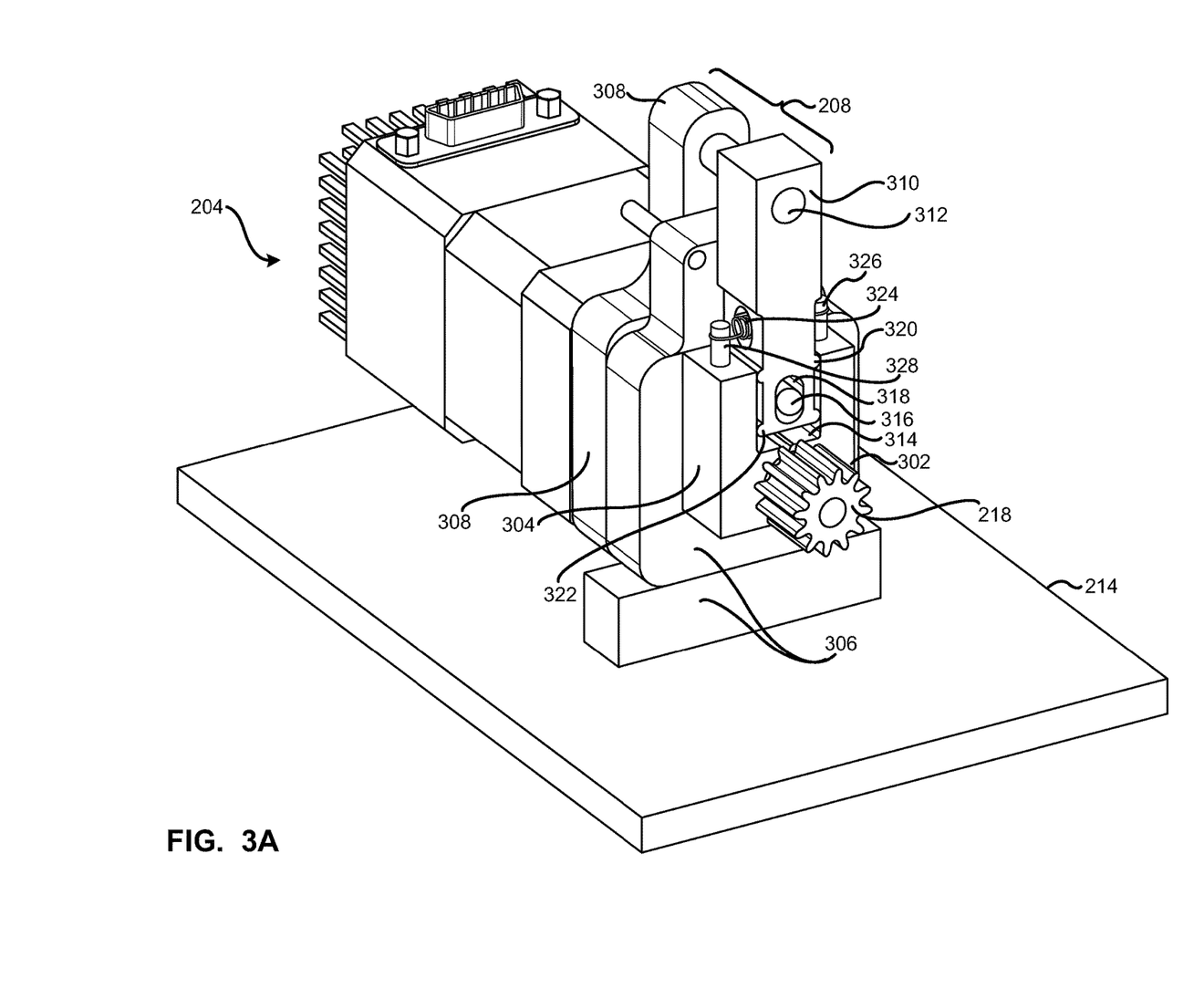
FIG. 3A is a detailed view of the example motor and braking assembly of FIG. 2.
Figure 3B:
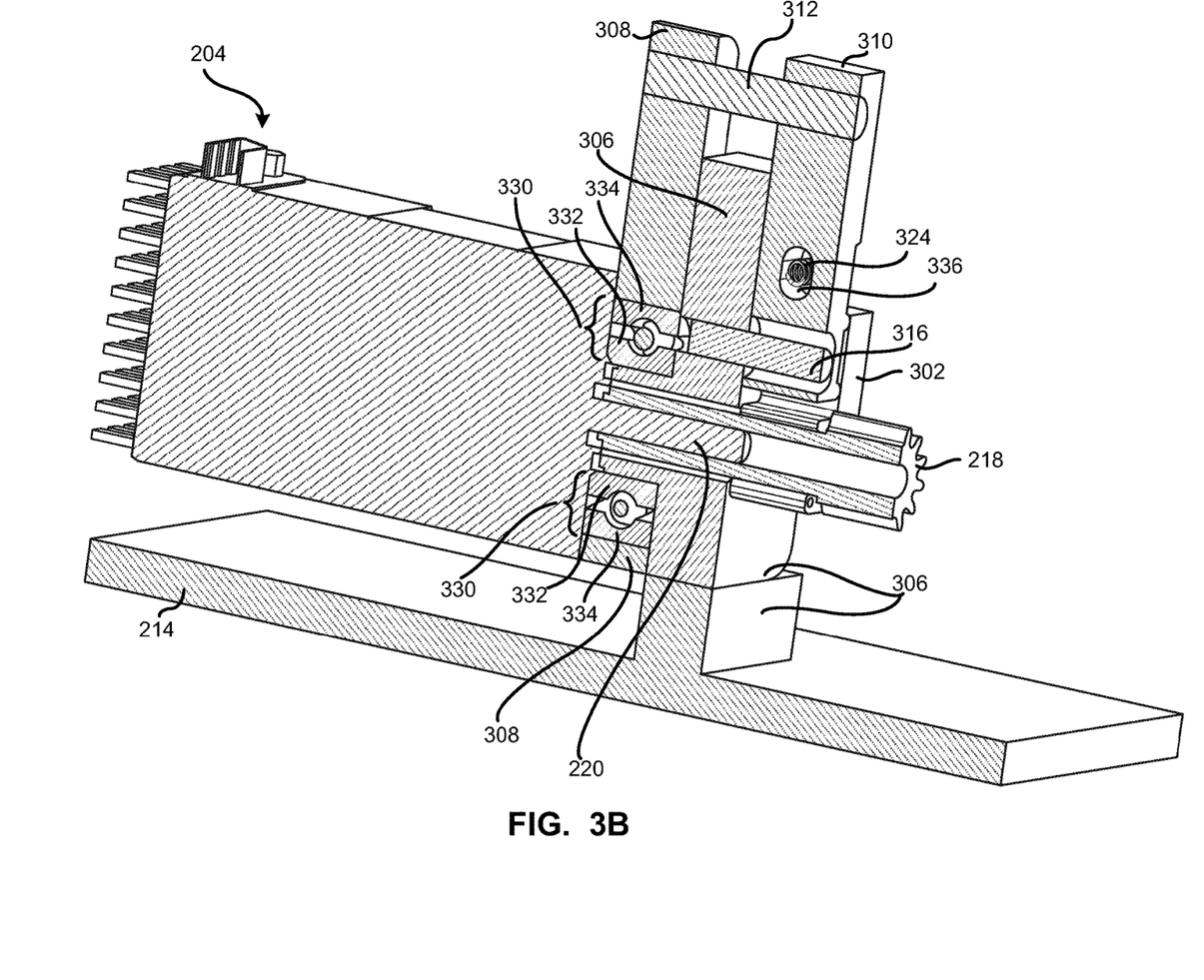
FIG. 3B is a cross-sectional view of the example motor and braking assembly of FIG. 3A.
Figure 3C:
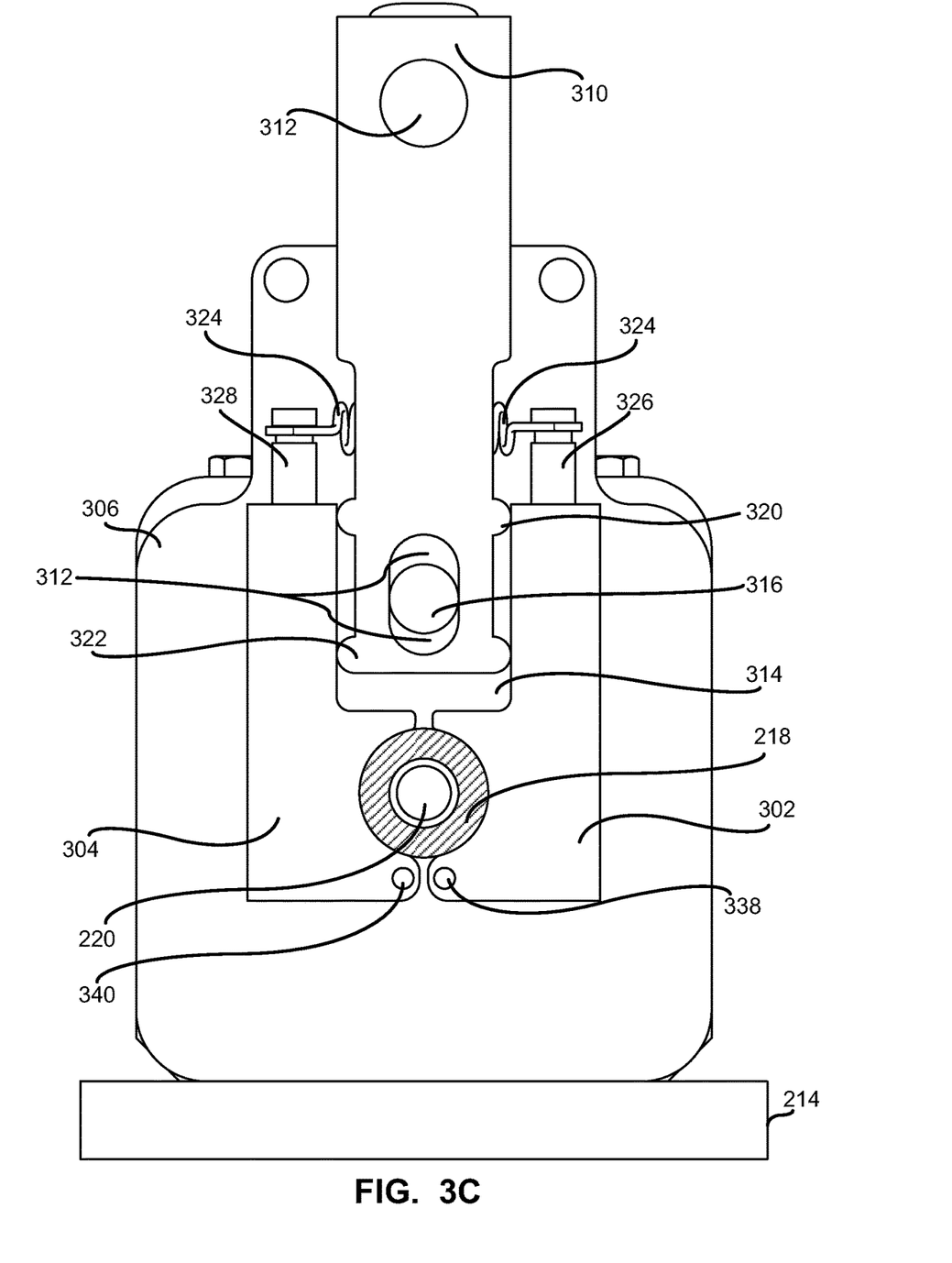
FIG. 3C is a cross-sectional view of the example motor and braking assembly of FIGS. 3A and 3B in an engaged position.
Figure 3D:
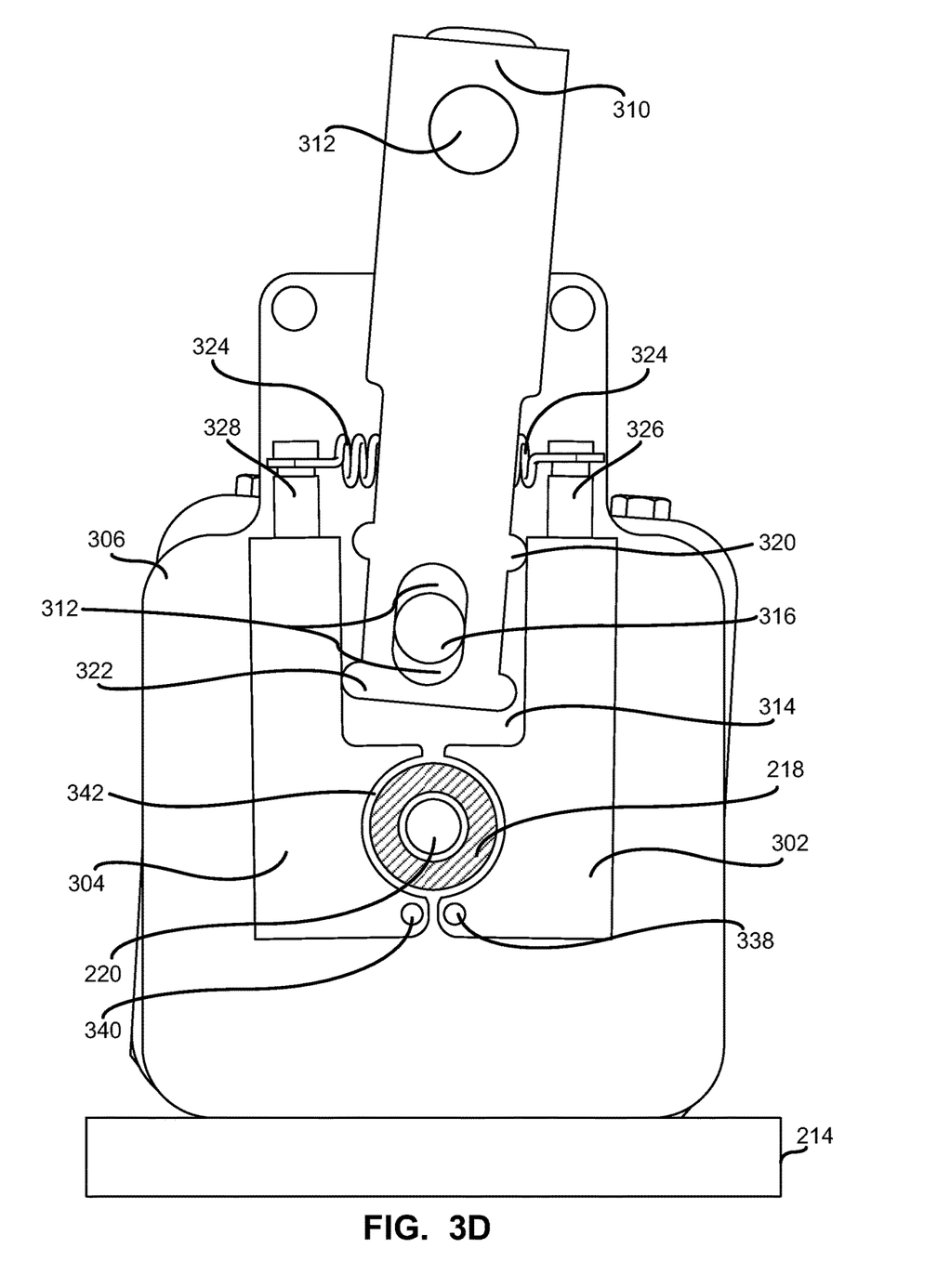
FIG. 3D is a cross-sectional view of the example motor and braking assembly of FIGS. 3A and 3B in a disengaged position.

FIG. 3A is a detailed view of the example motor 204 and the example braking assembly 208 of FIG. 2. FIG. 3B is a cross-sectional view of the motor 204 and the example braking assembly 208 of FIG. 3A. FIG. 3C is a cross-sectional view of the motor 204 and the example braking assembly 208 of FIGS. 3A and 3B with example brake pads 302, 304 of FIG. 3A in an engaged or clamped position. FIG. 3D is a cross-sectional view of the motor 204 and the example braking assembly 208 of FIGS. 3A and 3B with the brake pads 302, 304 of FIG. 3A in a disengaged or unclamped position. FIGS. 3A, 3B, and 3C also show the example brake pads 302, 304 in the engaged or clamped position. In the illustrated examples of FIGS. 3A, 3B, 3C, 3D, a portion of the actuator housing 214 has been removed for clarity.

Referring to FIG. 3A, the motor 204 is disposed inside the actuator housing 214. The motor 204 (e.g., an electric motor) is coupled to the housing 214 via a stationary mount 306, which is fixed relative to the housing 214. The motor 204 is supported by the mount 306 and rotatable relative to the mount 306. The illustrated example includes the first gear 218 of the transmission 206 (FIG. 2) extending from the braking assembly 208 to engage an intermediate gear (not shown).

The braking assembly 208 is operatively coupled to the motor 204 and the mount 306. The braking assembly 208 includes a reaction arm 308 and a brake release arm 310. A first end of the reaction arm 308 is rigidly coupled to a first end of the brake release arm 310 via a brake release bolt 312.

A second end of the brake release arm 310 is disposed in a brake pad gap 314 (or cavity) between the opposing brake pads 302, 304. Extending from the mount 306 is a release arm pivot 316 disposed within an oval shaped pivot opening 318 near the second end of the brake release arm 310. The oval shape of the pivot opening 318 enables the brake release arm 310 to pivot and translate relative to the release arm pivot 316. In particular, the oval or oblong shape of the pivot opening 318 enables both the brake release arm 310 and the motor 204 to rotate freely about their different axes of rotation. A release arm protrusion 320, extending from a first side of the brake release arm 310, engages the brake pad 302 and a release arm protrusion 322, extending from a second side of the brake release arm 310, engages the brake pad 304. In addition, though two release arm protrusions extending from the first side of the brake release arm 310 and two release arm protrusions extending from the second side of the brake release arm 310 are shown in the illustrated example, in other examples, there may be other numbers of release arm protrusions extending from the first side and/or the second side of the brake release arm 310 such as, for example, one, four, or any other suitable number.

In the illustrated example, a first end of a spring 324 is connected to a first spring-retaining boss 326 of the first brake pad 302 and a second end of the spring 324 is connected to a second spring-retaining boss 328 of the second brake pad 304.

As shown in FIG. 3B, the output shaft 220 extends from the motor 204 and is rigidly coupled (e.g., via a pin or press fit) to the first gear 218. In the illustrated example of FIGS. 3A and 3B, the first gear 218 is shown as a spur gear, but other types of gears may also be used.

The reaction arm 308 is coupled to the mount 306 via a bearing assembly 330 including an inner race 332 and an outer race 334. The inner race 332 (or sleeve) of the bearing assembly 330 is coupled (e.g., via a pin or press fit) to the mount 306. The outer race 334 of the bearing assembly 330 is coupled (e.g., via a pin or press fit) to the reaction arm 308. In this manner, the reaction arm 308 is able to rotate about the output shaft 220/spur gear 208. However, other coupling elements that enable rotational movement, such as a bushing, may also be used. In addition, the reaction arm 308 is fixed to the motor 204 via, for example, a socket head cap screw (not shown). However, other methods of fixing the reaction arm 308 relative to the motor 204 are also possible.

The spring 324 is positioned through a release arm opening 336 of the brake release arm 310 to urge the brake pads 302, 304 into engagement with the output shaft 220/spur gear 218. In the illustrated example, the release arm opening 336 is oval shaped to allow the brake release arm 310 to pivot or rotate and translate without contacting the spring 324.

As shown more clearly in FIGS. 3C, 3D, first ends of the brake pads 302, 304 are coupled to the mount 306 via brake pad pivots 338, 340. The brake pad pivots 338, 340 provide a pivot for the brake pads 302, 304, respectively, to rotate about in opposite directions.

Referring to FIGS. 3A, 3B, 3C, 3D, in operation, when the braking assembly 208 is in the engaged position, as shown in FIG. 3C, the brake pads 302, 304 engage the output shaft 220/spur gear 218. Friction between the brake pads 302, 304 and the output shaft 220/spur gear 218 prevents the output shaft 220/spur gear 218 from rotating. The brake pads 302, 304 engaging (e.g., clamping) the output shaft 220/spur gear 218 provides backdrive resistance and prevents movement of the motor 204 and, thus, prevents movement (e.g., rotation) of any valve flow control member operatively coupled thereto. In some such examples, electric power to the motor 204 may be removed to conserve energy.

In response to the motor 204 starting, a reaction torque of the motor 204 causes the reaction arm 308, which is fixed relative to the motor 204, to rotate via the bearing assembly 330. The brake release bolt 312 rigidly couples the reaction arm 308 to the brake release arm 310 and, thus, in response to the reaction torque, the brake release arm 310 pivots about the release arm pivot 316. The load of the spring 324 is overcome by the reaction torque and the release arm protrusion 320 engages and moves the first brake pad 302 in a first direction and the release arm protrusion 322 engages and moves the second brake pad 304 in a second direction opposite to the first direction (FIG. 3D). As a result, the rotation of the brake release arm 310 biases the brake pads 302, 304 to disengage the brake pads 302, 304 from the output shaft 220/spur gear 218. The brake pads 302, 304 disengaging (e.g., unclamping) from the output shaft 220/spur gear 218 creates a gap 342 between the brake pads 302, 304 and the output shaft 220/spur gear 218 and enables the output shaft 220/spur gear 218 to rotate freely in either direction.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    a brake to engage an output shaft of a motor;
    a brake release arm operatively engaged to the brake;
    a motor mount to support the motor and including a pivot about which the brake release arm rotates, the pivot being held in a fixed position relative to the motor mount; and
    a reaction arm extending from the motor, an orientation of the reaction arm to be fixed relative to an orientation of the brake release arm, and the reaction arm to be operatively coupled to the motor to cause the brake release arm to disengage the brake from the output shaft of the motor in response to a reaction torque of the motor.

2. The apparatus of claim 1, wherein the motor is rotatable relative to the motor mount in response to the reaction torque.

3. The apparatus of claim 2, wherein the brake release arm rotates about the pivot in response to the reaction torque.

4. The apparatus of claim 2, wherein the motor mount comprises a second pivot about which the brake rotates in response to the reaction torque.

5. The apparatus of claim 1, wherein the brake comprises opposing brake pads to be pivoted in opposite directions in response to the reaction torque.

6. The apparatus of claim 5, further comprising a spring to bias the brake pads to engage the output shaft to prevent rotation of the output shaft.

7. The apparatus of claim 1, further comprising the motor, and wherein the motor is an electric motor.

8. An apparatus, comprising:
    a first brake pad;
    a second brake pad;
    a spring operatively coupled to the first brake pad and the second brake pad, the spring to hold the first brake pad and the second brake pad in an engaged position to prevent rotation of an output shaft of a motor when power to the motor is removed;
    a brake release arm positioned between the first brake pad and the second brake pad;
    a motor mount to support the motor and including a pivot about which the brake release arm rotates, the pivot being held in a fixed position relative to the motor mount; and
    a reaction arm to extend from the motor, an orientation of the reaction arm to be fixed relative to an orientation of the brake release arm and the reaction arm to be operatively coupled to the motor to cause the brake release arm to distance the first brake pad from the second brake pad to disengage the output shaft in response to a reaction torque of the motor.

9. The apparatus of claim 8, wherein the reaction torque of the motor corresponds to when power is provided to the motor, and, in response to the reaction torque, the reaction arm to cause the brake release arm to bias the first brake pad and the second brake pad.

10. The apparatus of claim 9, wherein the first brake pad and the second brake pad are opposing brake pads and pivot in opposite directions in response to the reaction torque.

11. The apparatus of claim 9, wherein the motor pivots relative to the motor mount in response to the reaction torque.

12. The apparatus of claim 11, wherein the motor mount comprises a bearing about which the reaction arm rotates in response to the reaction torque.

13. The apparatus of claim 11, wherein the brake release arm rotates in response to the reaction torque.

14. The apparatus of claim 11, wherein the first brake pad and the second brake pad pivot in opposite directions in response to the reaction torque.

15. The apparatus of claim 8, further comprising a valve stem operatively coupled to the output shaft, wherein rotation of the output shaft causes the valve stem to move in a rotational direction.

16. The apparatus of claim 15, wherein the valve stem is operatively coupled to a flow control member of a fluid valve.

17. The apparatus of claim 8, further comprising the motor, and wherein the motor is an electric motor.

18. An apparatus, comprising:
   means for braking an output shaft of a motor to prevent rotation of the output shaft;
   means for disengaging the means for braking from the output shaft to enable rotation of the output shaft in response to a reaction torque of the motor;
   means for mounting the motor, the means for mounting including a means for pivoting, the means for disengaging pivoting about the means for pivoting, the means for pivoting being held in a fixed position relative to the means for mounting; and
   means for activating the means for disengaging, the means for activating operatively coupled to and extending from the motor, an orientation of the means for disengaging to be fixed relative to an orientation of the means for activating.

19. The apparatus as defined in claim 18, wherein the means for disengaging is to move at least a portion of the means for braking away from the output shaft.

20. The apparatus as defined in claim 18, wherein the means for braking includes means for moving at least a portion of the means for braking toward the output shaft.

* * * * *

UNITED STATES PATENT AND TRADEMARK OFFICE
CERTIFICATE OF CORRECTION

PATENT NO. : 9,634,541 B2  Page 1 of 1
APPLICATION NO. : 13/933946
DATED : April 25, 2017
INVENTOR(S) : Trenton Jackson It is certified that error appears in the above-identified patent and that said Letters Patent is hereby corrected as shown below:

In the Claims

Column 8, Line 52 (Claim 9): Replace "reaction arm to cause" with --reaction arm is to cause--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*